Sept. 27, 1955 V. H. KRAYBILL 2,719,266
INSTANTANEOUS FLICKER VOLTAGE MEASURING DEVICE
Filed March 21, 1951 3 Sheets-Sheet 1
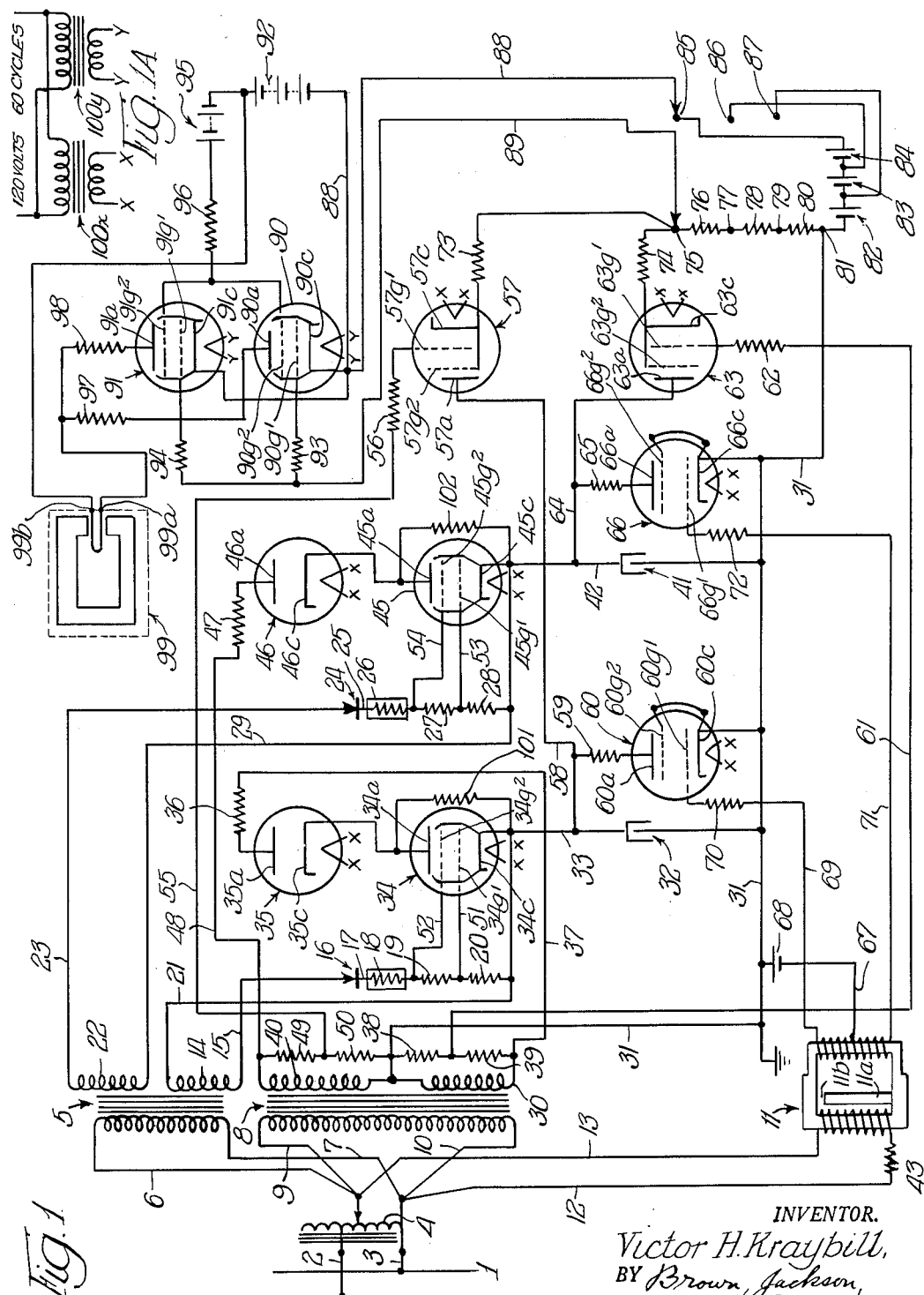
INVENTOR.
Victor H. Kraybill,
BY Brown, Jackson,
Boettcher & Dienner Sept. 27, 1955   V. H. KRAYBILL   2,719,266
INSTANTANEOUS FLICKER VOLTAGE MEASURING DEVICE
Filed March 21, 1951   3 Sheets-Sheet 2
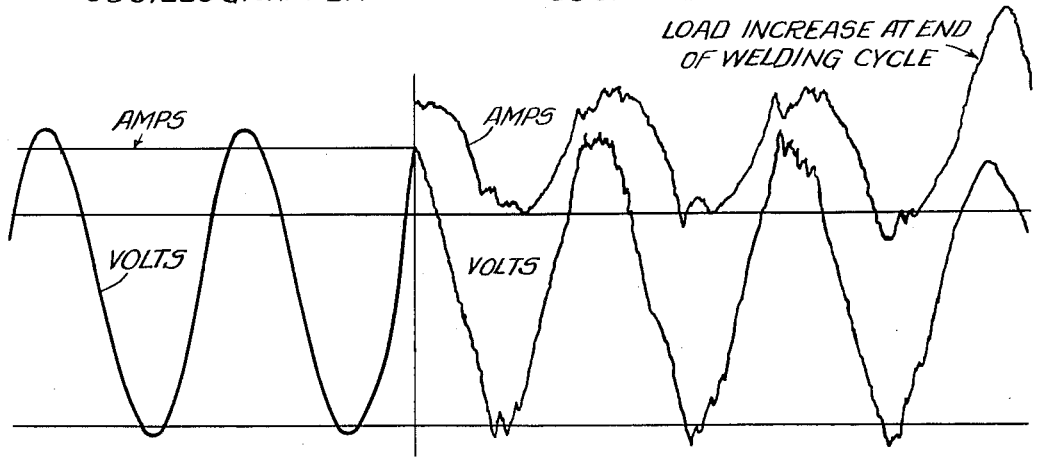
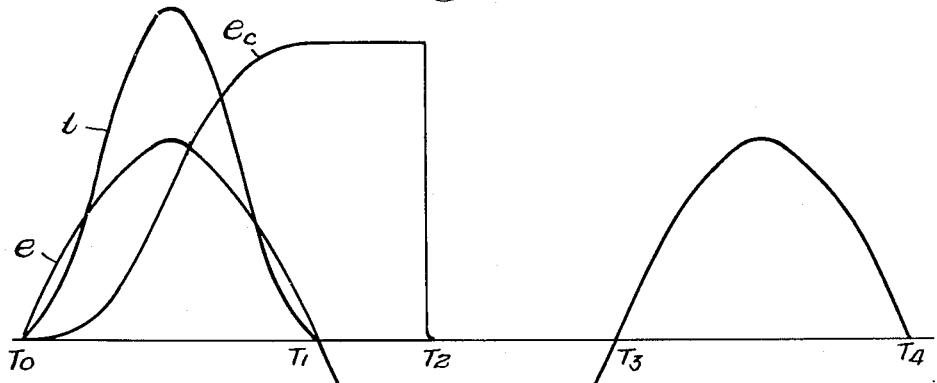
INVENTOR.
Victor H. Kraybill,
BY Brown, Jackson,
Boettcher & Dienner
attys United States Patent Office 2,719,266
Patented Sept. 27, 1955

2,719,266

INSTANTANEOUS FLICKER VOLTAGE MEASURING DEVICE

Victor H. Kraybill, Brookfield, Ill.

Application March 21, 1951, Serial No. 216,781

11 Claims. (Cl. 324—123)

The present invention relates to an improved flicker voltage measuring device.

The measurement of rapid changes in voltage, commonly known as flicker voltage, and usually caused by electric welders, furnaces, or reciprocating pumps, presents problems not encountered in ordinary electrical measurements. Conventional types of indicating and recording meters now in use show R. M. S. values (i. e., root-mean-square or effective values) but respond too slowly. Conventional oscillographs record instantaneous values and consequently have ample speed of response, but it is extremely difficult to obtain root-mean-square values from an oscillogram of a voltage when there is a variation of the wave form from one cycle to the next. Frequently electric welding machines and furnaces cause appreciable variations in the supply voltage wave form.

To measure these flicker voltages, it is necessary to have a device which is very rapid in response and which will also record R. M. S. values. In some cases, particularly in research problems, it is necessary to measure the R. M. S. value of each individual positive and negative half-cycle of alternating voltage. I have accomplished this by devising improved apparatus consisting of two separate measuring circuits, an electronic switching arrangement, a bucking circuit and an electronic amplifier. It may be used in connection with an oscillograph to obtain a photographic record of the flicker voltage. One of these two measuring circuits selects the positive half-cycles and measures the sum of the squares of the instantaneous values of voltage for each positive half-cycle. This value is recorded on the oscillograph film during the following quarter-cycle. Similarly the other measuring circuit measures the sum of the squares of the instantaneous values of each negative half-cycle of voltage and these values are likewise recorded during the following quarter-cycle. These recorded values when considered with the calibration data give value of R. M. S. voltage change. Due to the bucking circuit a small change in the voltage being measured causes a large change in the recorded value.

While the device is designed primarily for the measurement of voltages it could with slight modifications also be used for the measurement of current.

The advantages of this improved apparatus are: (1) it has an extremely high speed of response; (2) it possesses the ability to measure voltage flicker which is too small to affect the light output of a lamp bulb so as to be noticeable to the eye; (3) it is practically unaffected by wave form.

Other features, objects and advantages of the invention will be apparent from the following detailed description of one preferred embodiment thereof. In the accompanying drawings illustrating such embodiment:

Figure 1 is a circuit diagram of my improved apparatus;

Figure 1A is a fragmentary circuit diagram showing the filament supply to the tubes of Figure 1;

Figure 3:
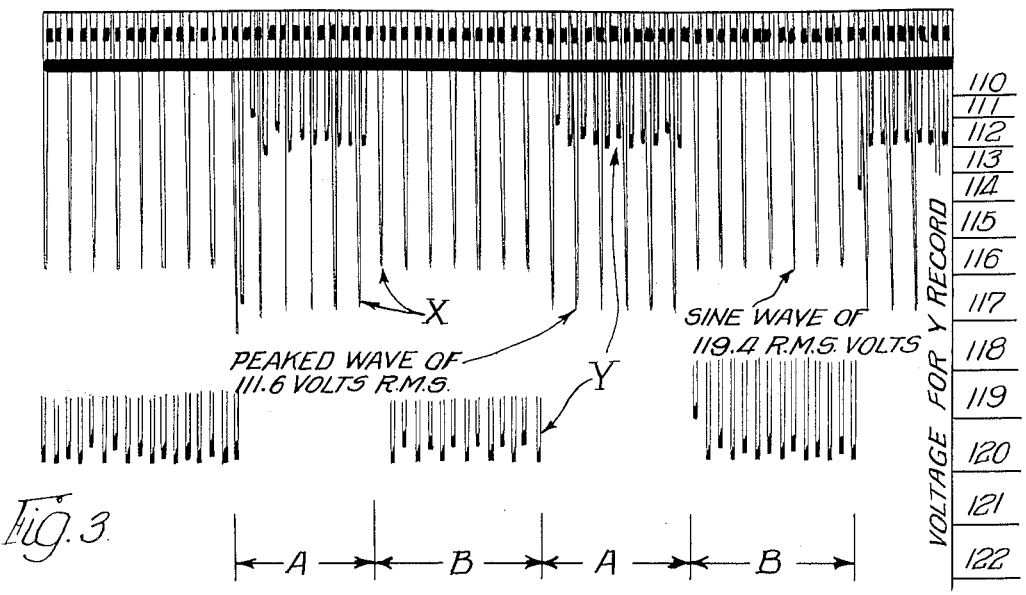
Figure 4:
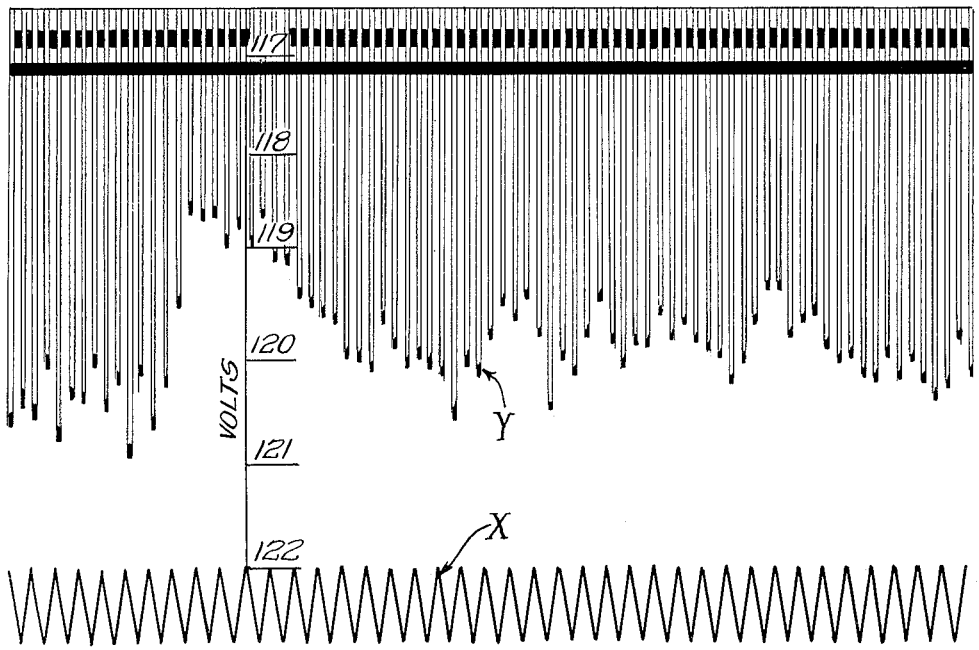

Figure 2 is an oscillogram chart which illustrates the difficulties heretofore encountered when attempting to obtain R. M. S. values from an ordinary oscillogram;

Figure 3 is an oscillogram chart showing a record obtained by means of my improved apparatus operating under conditions similar to those of Figure 2;

Figure 4 is a typical oscillogram of voltage variations produced by an electric furnace and obtained with my improved apparatus; and Figure 5 is an explanatory graph.

Referring to Figure 1, the alternating current line which is to have its flicker voltage measured is indicated at 1. My improved apparatus has two main input terminals 2 and 3 which are adapted to be connected across this alternating current line. A variable ratio autotransformer 4 is connected to these terminals. The output of this autotransformer is connected to the primary of transformer 5 by means of conductors 6 and 7, to the primary of the transformer 8 by means of conductors 9 and 10, and to the primary of peaking transformer 11 by means of conductors 12 and 13.

The transformer 5 has two secondary windings 14 and 22. The circuit for the secondary 14 is from one end thereof through conductor 15 to the rectifier 16, conductor 17 to a non-linear resistor 18, through resistors 19 and 20, and through conductor 21 back to the other end of said secondary. Likewise, the circuit for the other secondary 22 of transformer 5 is from one end thereof through conductor 23, rectifier 24, conductor 25, non-linear resistor 26, resistors 27 and 28 and conductor 29, back to the other end of said latter secondary.

Referring now to the transformer 8 which has two secondary windings 30 and 40, the circuit for the secondary 30 is through conductor 31, condenser 32, conductor 33, tube 34, tube 35, resistor 36 and conductor 37 completing the circuit. There is also a voltage divider circuit consisting of resistors 38 and 39 connected from conductor 31 to conductor 37. Likewise the circuit for the other secondary 40 of transformer 8 is through conductor 31, condenser 41, conductor 42, tube 45, tube 46, resistor 47 and conductor 48 completing the circuit. There is also a voltage divider circuit consisting of resistors 49 and 50 connected from conductor 31 to conductor 48.

The non-linear resistors 18 and 26 are composed of a substance such as Thyrite which has the peculiar property of having a decreasing value of resistance as the voltage across it is increased. The control grid $34g1$ of tube 34 is connected to the junction of resistors 19 and 20 by means of conductor 51, and the screen grid $34g2$ of this tube 34 is connected by means of the conductor 52 to the junction of resistors 18 and 19. Likewise, conductor 53 connects grid $45g1$ of tube 45 to the junction of resistors 27 and 28, and conductor 54 connects grid $45g2$ of this same tube to the junction of resistors 26 and 27.

Let us now consider an alternating voltage wave as shown by curve $e$ in Figure 5. The horizontal axis represents time, the time interval from T0 to T1 being $\frac{1}{120}$ of a second for a 60 cycle per second wave. The vertical distance from the horizontal axis to the wave $e$ represents the instantaneous value of the voltage wave at any given instant. Starting at T0, $e$ increases from zero to a maximum value and then decreases to zero at T1. The voltage $e$ causes current to flow through resistors 18, 19 and 20. This causes grids $34g1$ and $34g2$ of tube 34 to become positive with respect to the cathode $34C$, and tube 34 becomes conducting. The ohmic values of resistors 18, 19 and 20 are so chosen that the instantaneous values of the current $i$ through circuit 30, 31, 32, 33, 34, 35, 36 and 37 are proportional to the square of the instantaneous values of $e$, as shown by curve $i$ in Figure 5. This current $i$ charges the condenser 32. The voltage across condenser 32 is increasing during the time interval T0 to T1, as shown by the curve ec in Figure 5, and reaches a maximum value of approximately 60 volts. Thus, the value of the voltage ec across the condenser 32 is proportional to the average of the squares of the instantaneous values of e, and is therefore a measure of the R. M. S. or effective voltage. There is a small error due to the difficulty of having i be an exact square of e, and also because of the voltage being built up on the condenser 32 affecting the circuit. However, by proper design this error is made negligibly small for all ordinary wave forms. The peak value of the voltage in secondary 30 is approximately ten times the maximum value of ec.

Rectifier 16 prevents current from flowing in the circuit connected to secondary 14 when the voltage e has the polarity as shown during the time interval T1 to T3 of Figure 5, and rectifier 24 likewise prevents current flow in the circuit connected to secondary 22 when the voltage e has the polarity as shown during the time intervals T0 to T1 and T3 to T4. This reduces heating of the non-linear resistors 18 and 26. Tube 35 and resistor 101 prevent high voltage stresses with possible breakdown of tube 34 during the time tube 34 is not conducting, i. e. during time intervals similar to T1 to T3. Likewise tube 46 and resistor 102 prevent high voltage stresses with possible breakdown of tube 45 during the time tube 45 is not conducting, i. e. during time intervals similar to T0 to T1.

Conductor 55 connects the junction of resistors 49 and 50 to the control grid $57g1$ of the tube 57, with the resistor 56 interposed. Conductor 58 connects conductor 33 to the anode $57a$ of tube 57 and also to the anode $60a$ of tube 60, with resistor 59 interposed between conductor 58 and anode $60a$. Likewise conductor 61 connects the junction of resistors 38 and 39 to the control grid $63g1$ of tube 63, with the resistor 62 interposed. Conductor 64 connects conductor 42 to the anode $63a$ of tube 63 and also to the anode $66a$ of tube 66, with resistor 65 interposed between 64 and $66a$. Conductor 67 connects the mid-tap of the secondary of the peaking transformer 11 to the negative terminal of a battery 68. The positive terminal of battery 68 is connected to conductor 31. Conductor 69 connects one of the secondary terminals of peaking transformer 11 to the control grid $60g1$ of tube 60, with resistor 70 interposed. Conductor 71 connects the other secondary terminal of transformer 11 to the control grid $66g1$ of tube 66, with resistor 72 interposed. The cathodes $57c$ and $63c$ of tubes 57 and 63 are connected through resistors 73 and 74 respectively to terminal 75. Resistor 76 is connected between terminals 75 and 77. Resistor 78 is connected between terminals 77 and 79. Resistor 80 is connected between terminals 79 and 81. Conductor 31 is also connected to terminal 81.

As previously described, the condenser 32 is being charged during the time interval T0 to T1 of Figure 5, and the voltage across condenser 32 is a measure of the R. M. S. value of the half-cycle of the voltage e during the time interval T0 to T1. During the succeeding time interval T1 to T3, voltage e increases negatively from zero to a maximum negative value and then decreases to zero. When voltage e becomes negative, control grid $57g1$ of tube 57 becomes positive with respect to cathode $57c$, and tube 57 becomes conducting and a voltage then exists between terminals 75 and 81 which is proportional to the voltage across condenser 32. Resistors 73, 76, 78 and 80 are of sufficiently high resistance so that condenser 32 discharges very slowly through them. An oscillographic record of this voltage between terminals 75 and 81 is made in a manner which will be described later. Transformer 11 is so designed that the voltage across its secondary has a very peaked wave form. For example, it may have a magnetic shunt $11a$ provided with an air gap $11b$. A suitable resistor 43 may be provided in the primary circuit of this peaking transformer. The battery 68 causes control grid $60g1$ of tube 60 to be negatively biased with respect to cathode $60c$. At time T2 the voltage from the secondary of transformer 11 overcomes this negative bias and causes $60g1$ to become positive and tube 60 becomes conducting, thereby discharging condenser 32 very rapidly and reducing ec, Figure 5, to zero. Resistor 59 is of such a value as to limit the discharge current to a value such as not to damage tube 60, but still allow the condenser 32 to become discharged very rapidly. Condenser 32 is now in a discharged condition and is ready to again receive a charge during the time interval T3 to T4 in the same manner as described for the time interval T0 to T1.

The same action that has been described in detail for measuring the value of e during the interval T0 to T1 when e is positive also takes place in the circuits connected to secondaries 22 and 40 in order to measure the value of the negative half-cycle of e during the time interval T1 to T3. This action of measuring the R. M. S. value of each positive and negative half-cycle continues as long as the apparatus is energized. We thus have a succession of voltage pulses existing between the terminals 75 and 81. The beginning of each one of these pulses occurs at the end of each half-cycle of the voltage on the line 1, i. e. when e of Figure 5 crosses the zero axis, namely T0, T1 and T3. The pulse lasts for approximately .2 of a cycle (time interval T1 to T2) and there are 120 pulses per second when measuring a 60 cycle per second wave.

Battery 82 is connected between terminals 81 and 87. Batteries 82 and 83 are in series between terminals 81 and 86. Batteries 82, 83 and 84 are all in series between terminals 81 and 85. Terminals 87, 86 and 85 are all positive with respect to 81. Conductor 88 is shown as connecting terminal 85 to the cathodes 90C and 91C of tubes 90 and 91, respectively, and also to the negative terminal of the battery 92. However, conductor 88 is adapted for connection selectively to either of the other terminals 86 or 87. Conductor 89 is shown as connecting terminal 75 to the control grids $90g1$ and $91g1$ of tubes 90 and 91 with resistors 93 and 94, respectively interposed. However, this conductor 89 is also adapted for connection selectively to either of the other terminals 77 or 79. In series with battery 92 is battery 95, the positive terminal of which is connected to the screen grids $90g2$ and $91g2$ of tubes 90 and 91, with resistor 96 interposed. The anode $90a$ of tube 90 with resistor 97 interposed, and the anode $91a$ of tube 91 with resistor 98 interposed are connected to terminal $99a$ of the oscillograph 99. Terminal $99b$ of oscillograph 99 is connected to the positive terminal of battery 92. The oscillograph 99 may be of any suitable type, such as a "type PA universal oscillograph" manufactured by Westinghouse Electric Corporation.

The cathode heater terminals x—x of tubes 34, 35, 45, 46, 57, 63, 60 and 66 are connected to the x—x terminals of the filament transformer $100x$, shown in Figure 1A. The cathode heater terminals y—y of tubes 90 and 91 are connected to the y—y terminals of the filament transformer $100y$, also shown in this figure. The primaries of these filament transformers $100x$ and $100y$ are connected to any 120 volt 60 cycle source.

As above described, immediately following each half-cycle, a voltage pulse, whose amplitude is proportional to the R. M. S. value of this preceding hlaf-cycle, occurs between terminals 75 and 81. In the interim of time between pulses, the voltage between terminals 75 and 81 is practically zero. Batteries 82, 83 and 84 cause control grids $90g1$ and $91g1$ of tubes 90 and 91 to be biased beyond cut-off, consequently tubes 90 and 91 do not pass current and there is no deflection of the light beam on the recording oscillograph 99. When a voltage pulse occurs across terminals 75 and 81 this voltage is in opposition to and of a slightly smaller value than the previously mentioned bias voltage from batteries 82, 83 and 84. Therefore, the control grids $90g1$ and $91g1$ will be biased only slightly negative, with the result that tubes 90 and 91 will become conducting and the light beam of the oscillograph 99 will be deflected. Thus the light beam of the oscillograph is continuously alternating each half-cycle between no deflection and a deflection which varies with the R. M. S. value of each individual hlaf-cycle of the voltage of the line 1. The voltage acting on control grids 90g1 and 91g1 is the differential of the voltage of the battery (batteries 82 plus 83 plus 84) acting in opposition to the voltage between terminals 75 and 81, and therefore a small percentage change in the voltage between terminals 75 and 81 will cause a large percentage change in the voltage on the control grids 90g1 and 91g1 and consequently a large change in the deflection of the oscillograph 99. In the preferred embodiment of my invention, a change of approximately four percent (4%) of the voltage in the line 1 will cause a change from full scale to zero deflection on the oscillograph 99.

It is appropriate to explain the purpose of the variable ratio autotransformer 4 at this point. The bias on the control grids 90g1 and 91g1 must be within the operating range of the tubes 90 and 91. This bias is the differential between the voltage from batteries 82, 83 and 84, and the voltage pulse across terminals 75 and 81. Since the battery voltage is fixed, the voltage pulse across terminals 75 and 81 must be within a certain range for all tests. This pulse voltage is determined by the input voltage to transformers 5 and 8. The autotransformer 4 is used to adjust the input voltage to the desired value, even though the voltage on line 1 may not be the same for all tests.

My invention is also provided with means for adjusting the value of flicker voltage required for full scale deflection of the oscillograph 99, such residing in the shiftability of conductors 88 and 89 to different terminals 85, 86, 87 and 75, 77 and 79, respectively, as previously described. If the flicker voltage on line 1 is so large that the oscillograph 99 moves beyond the proper measuring range, then the conductors 88 and 89 are shifted from terminals 85 and 75 to terminals 86 and 77, respectively. Thus, a smaller battery voltage is used to oppose a portion, instead of a whole, of the voltage between terminals 75 and 81, and a larger percentage change in the voltage of the line 1 will be required in order to produce a full scale change on the oscillograph 99. Likewise, moving conductors 88 and 89 to terminals 87 and 79 respectively will cause a still larger percentage change in the voltage of the line 1 to be required in order to produce a full scale change on the oscillograph 99.

To illustrate some difficulties encountered when attempting to obtain R. M. S. values from an ordinary oscillogram, attention is directed to Figure 2. The oscillogram 2A at the left of Figure 2 shows the normal voltage and current on an electricity supply line for a certain welding machine adapted to weld barrels, when the welding current is turned off. The right hand oscillogram 2B shows the voltage and current on the line when the welder is operating. Both oscillograms show the voltage to the same scale. It will be noted that the vertical peak-to-peak voltage distance is greater on oscillogram 2B than on oscillogram 2A, which would give the impression that there was a voltage rise when the welder was turned on. However, this particular welding operation was of long enough duration to read the voltage drop on an indicating voltmeter, and the voltmeter showed an actual voltage drop of approximately 6% when the welder was turned on, contrary to the indications of the oscillograms 2A and 2B. This erroneous indication is due to the peaked wave form of the voltage shown on oscillogram 2B. The voltage shown on oscillogram 2A has practically a sine wave form. However, even when making a conventional oscillogram on an ordinary oscillograph under conditions where there is no change in wave form, it is not possible to read the ordinary oscillogram to the necessary degree of accuracy.

Referring now to Figure 3, this shows an oscillogram chart of a laboratory test illustrating conditions similar to those prevailing in Figure 2. There are two records of the same voltage; one is the conventional oscillogram record, indicated by X, and the other an oscillogram record produced with my improved flicker voltage measuring apparatus, indicated by Y. There is also a voltage scale at the right hand side of the chart which is applicable to the Y record. During the time intervals B, the voltage had a sine wave form and a R. M. S. value of 119.4 volts. During the time intervals A, the voltage had a peaked wave form and a R. M. S. value of 111.6 volts, but with a peak value 4% greater than during time intervals B. My improved apparatus gives a correct indication of the voltage change during the transitions from A to B and B to A, whereas the conventional oscillogram of instantaneous values would give an erroneous indication.

Figure 4 is an oscillogram record of an actual measurement of the voltage flicker caused by an electric furnace. The voltage variations as recorded by my improved apparatus are shown at Y. At X is shown a 60 cycle per second timing wave. Each dot in the Y record shows the R. M. S. (effective) value of a half-cycle of voltage as read on the scale.

By having the proper number of turns on the primaries of transformers 5, 8 and 11, the invention can also be used to measure alternating current.

In the preferred embodiment of flicker voltage measuring apparatus which I have described above, and which I have operated satisfactorily, I have employed tubes, resistors, condensers and batteries of the following types and approximate values in the circuit of Figure 1:

Non-linear resistors 18 and 26=400 ohms at 100 volts.
Resistors 19 and 27=200 ohms.
Resistors 20 and 28=25 ohms.
Condensers 32 and 41=2 mfd.
Tubes 34 and 45=type 6L6.
Tubes 35 and 46=type 6X5.
Resistors 36 and 47=2000 ohms.
Resistors 38 and 50=120,000 ohms.
Resistors 39 and 49=600,000 ohms.
Resistors 56 and 62=1 megohm.
Tubes 57 and 63=type 2050.
Resistors 59 and 65=20 ohms.
Tubes 60 and 66=type 2050.
Battery 68=22½ volts.
Resistors 70 and 72=33,000 ohms.
Resistors 73 and 74=50,000 ohms.
Resistor 76=100,000 ohms.
Resistors 78 and 80=50,000 ohms.
Batteries 82 and 83=15 volts.
Battery 84=30 volts.
Tubes 90 and 91=type 25L6.
Battery 92=45 volts.
Resistors 93 and 94=120,000 ohms.
Battery 95=22½ volts.
Resistor 96=50,000 ohms.
Resistors 97 and 98=30 ohms.

However, it will be understood that the preceding values and tube types are merely illustrative and that the invention is not limited thereto. Wherever the word "tube" is mentioned, it is to be understood that any device which performs the desired function may be used.

As previously described, the oscillograph 99 is any suitable oscillograph, such as a type PA universal oscillograph, manufactured by the Westinghouse Electric Corporation, and is disclosed more fully in my copending application on "Flicker Voltage and Current Measuring Apparatus," Serial No. 640,600, filed January 11, 1946, issued as Patent No. 2,549,976 on April 24, 1951. The device of the present application complements the device disclosed in said copending application. For certain types of flicker measurements the device of the copending application is the more satisfactory, and for other measuremnts the new device is very desirable.

While I have described and illustrated what I regard

I claim:

1. In apparatus for measuring flicker voltage on an alternating current load line, the combination of positive and negative half-cycle measuring circuits both adapted to be connected to said load line, resistance means in each of said positive and negative half-cycle measuring circuits including non-linear resistance means characterized by a decreasing value of resistance as the voltage across the resistance means rises, grid controlled positive and negative half-cycle measuring tubes having their grids responsive to the voltage drops across said resistance means in said positive and negative half-cycle measuring circuits, separate condensers connected to be charged from the cathode circuits of said measuring tubes, grid controlled amplifying tube means, means for establishing a negative grid bias in the grid circuit of said amplifying tube means, switching tube means for alternately connecting said condensers to said grid circuit to have the discharges from said condensers act in opposition to the negative grid bias established in said grid circuit, and an oscillograph responsive to the plate circuit flow through said amplifying tube means.

2. In apparatus for measuring flicker voltage on an alternating current load line, the combination of positive and negative half-cycle measuring circuits both adapted to be connected to said load line, resistance means in each of said positive and negative half-cycle measuring circuits including non-linear resistance means characterized by a decreasing value of resistance as the voltage across the resistance means rises, grid controlled positive and negative half-cycle measuring tubes having their grids responsive to the voltage drops across said resistance means in said positive and negative half-cycle measuring circuits, separate condensers connected to be charged from the cathode circuits of said measuring tubes, grid controlled amplifying tube means, means for establishing a negative grid bias in the grid circuit of said amplifying tube means, switching tube means for alternately connecting said condensers to said grid circuit to have the discharges from said condensers act in opposition to the negative grid bias established in said grid circuit, an oscillograph responsive to the plate circuit flow through said amplifying tube means, and discharge tube means for discharging said condensers after the oscillograph has responded to the condenser charges.

3. In apparatus for measuring flicker voltage on an alternating current load line, the combination of positive and negative half-cycle measuring circuits both adapted to be connected to said load line, resistance means in each of said positive and negative half-cycle measuring circuits including non-linear resistance means characterized by a decreasing value of resistance as the voltage across the resistance means rises, grid controlled positive and negative half-cycle measuring tubes having their grids responsive to the voltage drops across said resistance means in said positive and negative half-cycle measuring circuits, separate condensers connected to be charged from the cathode circuits of said measuring tubes, grid controlled amplifying tube means, means for establishing a negative grid bias in the grid circuit of said amplifying tube means, switching tube means for alternately connecting said condensers to said grid circuit to have the discharges from said condensers act in opposition to the negative grid bias established in said grid circuit, an oscillograph responsive to the plate circuit flow through said amplifying tube means, grid controlled discharge tube means for discharging said condensers after the oscillograph has responded to the condenser charges, and a peaking transformer adapted to be connected with said load line and connected with the grids of said discharge tube means.

4. In apparatus for instantaneously measuring flicker voltage on an alternating current load line, the combination of a variable ratio auto-transformer adapted to be connected to said load line, supply transformer means fed from said variable ratio auto-transformer and including two secondaries for energizing a positive half-cycle measuring circuit and a negative half-cycle measuring circuit respectively, grid resistor means in each of said measuring circuits including a non-linear resistor characterized by a decreasing value of resistance as the voltage across the resistor rises, rectifiers in said measuring circuit confining current flow in one of said circuits to positive half-cycles and current flow in the other of said circuits to negative half-cycles, grid controlled measuring tubes having their grids responsive to the voltage drops across said grid resistor means, separate condensers connected to be charged from the cathode circuits of said grid controlled measuring tubes, grid controlled amplifying tube means, a grid circuit therefor comprising resistor means and battery means normally establishing a negative bias on said grid circuit, switching tube means for alternately connecting said condensers to said latter grid circuit to have the discharges from said condensers flow in opposition to the negative bias on said latter grid circuit for reducing said negative bias, an oscillograph responsive to the plate circuit flow of said amplifying tube means, grid controlled discharging tube means for discharging said condensers after said oscillograph has responded to the condenser charges, and a peaking transformer operatively connected with said variable ratio auto-transformer and supplying peaked potentials to the grids of said discharging tubes.

5. In apparatus for measuring flicker voltage by recording the R. M. S. (effective) value of each individual positive and negative half-cycle of voltage on an alternating current power line, the combination of positive half-cycle measuring apparatus comprising resistors and electronic tube means for obtaining a current whose instantaneous value is at all times substantially proportional to the square of the instantaneous value of the positive half-cycles of the said voltage being measured, condenser means for integrating the said current for a time interval of one half-cycle of the said voltage being measured so as to charge the condenser means to a value of voltage which is proportional to the R. M. S. value of said half-cycle of voltage being measured, a source of substantially constant voltage, amplifying means, switching means adapted to, immediately after the end of said half-cycle of voltage being measured, bring the voltage charge on the condenser means into comparative relationship to said substantially constant voltage and applying the difference therebetween to the control circuit of said amplifying means, a peaking transformer, additional switching means actuated by a sharply peaked voltage from said peaking transformer, said additional switching means operating to discharge said condenser means before the beginning of the next positive half-cycle, thereby leaving said condenser means in a discharged condition ready to again perform its integrating function for the measurement of the next positive half-cycle; together with negative half-cycle measuring apparatus identical to the above recited positive half-cycle measuring apparatus, except that the same constant voltage source and amplifying means are used as for measuring the positive half-cycles, and an oscillograph connected to said amplifying means and responsive to both the measured positive half-cycles and to the measured negative half-cycles for making an oscillograph record of each individual positive and negative half-cycle of voltage on said alternating current power line.

6. In a device for measuring flicker voltage by recording the R. M. S. (effective) value of each individual positive and negative half-cycle of voltage on an alternating current power line, the combination of: positive half-cycle selecting and measuring apparatus comprising resistors and electronic tube means for obtaining a current whose instantaneous value is at all times substantially proportional to the square of the instantaneous value of the positive half-cycles of the said voltage being measured, said positive half-cycle selecting and measuring apparatus also including condenser means electrically connected with said apparatus for integrating the said current for the time interval of the positive half-cycle of the voltage being measured, whereby said condenser means is charged to a value of voltage which is proportional to the R. M. S. value of said positive half-cycle of voltage being measured; negative half-cycle selecting and measuring apparatus comprising resistors and electronic tube means for obtaining a current whose instantaneous value is at all times substantially proportional to the square of the instantaneous value of the negative half-cycles of the said voltage being measured, said negative half-cycles selecting and measuring apparatus also including condenser means electrically connected with said latter apparatus for integrating the said latter current for the time interval of the negative half-cycle of the said voltage being measured, whereby said latter condenser means is charged to a value of voltage which is proportional to the R. M. S. value of said negative half-cycle of voltage being measured; a source of substantially constant voltage; timed switching means having electrical connection with said power line to have a timed operation occurring synchronously with the frequency of the half-cycle alternations on said power line, said timed switching means being connected with said two condenser means and with said source of substantially constant voltage whereby immediately after the end of the positive or negative half-cycle of voltage being measured said time switching means brings the voltage charge of the corresponding condenser means into comparative relationship to said substantially constant voltage to produce a resultant voltage which is the difference between the two; amplifying means having a control circuit connected to respond to said resultant voltage; an oscillograph connected to the output of said amplifying means and responding in sequence to the successive positive half-cycle and negative half-cycle voltage measurements for making an oscillograph record of each individual positive and negative half-cycle of voltage on said alternating current power line; a peaking transformer electrically connected with said power line to produce peaked pulses occurring synchronously with the frequency of the half-cycle alternations on said power line; and discharge switching means electrically connected with said peaking transformer and electrically connected with the condenser means of said positive half-cycle measuring apparatus and with the condenser means of said negative half-cycle measuring apparatus for discharging said respective condenser means immediately after the charge on said condenser means has operated said oscillograph, thereby leaving each condenser means in a discharged condition ready to again perform its integrating function for the measurement of the next positive or negative half-cycle respectively.

7. In apparatus for measuring flicker voltage by recording the R. M. S. (effective) value of each individual positive and negative half-cycle of voltage on an alternating current power line, the combination of a first or positive half-cycle selecting and measuring means connected with said power line for selecting and measuring the positive half-cycles whereby to obtain a current whose instantaneous value is at all times substantially proportional to the square of the instantaneous value of the positive half-cycles of said voltage being measured, a first or positive half-cycle integrating condenser connected with said first selecting and measuring means for integrating the said current for the time interval of the positive half-cycle of the voltage being measured, whereby said first integrating condenser is charged to a value of voltage which is proportional to the R. M. S. value of said positive half-cycle of voltage being measured, a second or negative half-cycle selecting and measuring means connected with said power line for selecting and measuring the negative half-cycles of the voltage for obtaining a current whose instantaneous value is at all times substantially proportional to the square of the instantaneous value of the negative half-cycles of the said voltage being measured, a second or negative half-cycle integrating condenser connected with said second selecting and measuring means for integrating the said current for the time interval of the negative half-cycle of said voltage being measured, whereby said second integrating condenser is charged to a value of voltage which is proportional to the R. M. S. value of said negative half-cycle of voltage being measured, a source of substantially constant voltage, timed switching means electrically connected with said power line to have a timed switching frequency occurring synchronously with the alternating current frequency on said power line, said timed switching means being electrically connected with said first and second integrating condensers and with said source of substantially constant voltage for bringing the voltages of said integrating condensers into comparative relationship to said substantially constant voltage, amplifying means connected to respond to the difference in voltage between the voltage charges on said first and second integrating condensers and said source of substantially contant voltage, an oscillograph connected to the output of said amplifying means so as to respond to the measured values of the successive positive and negative half-cycles and thereby record each individual positive and negative half-cycle of voltage occurring on said alternating current power line during the measured interval, a peaking transformer electrically connected with said power line, and discharge switching means electrically connected with said peaking transformer and having a switching frequency timed thereby, said discharge switching means being electrically connected with said integrating condensers for discharging each of said condensers after the charge on each condenser has operated said oscillograph.

8. In a device for measuring flicker voltage by recording the R. M. S. (effective) value of each individual positive and negative half-cycle of voltage on an alternating current power line, the combination of: positive half-cycle selecting and measuring apparatus comprising resistors and electronic tube means for obtaining a current whose instantaneous value is at all times substantially proportional to the square of the instantaneous value of the positive half-cycles of the said voltage being measured, said positive half-cycle selecting and measuring apparatus also including condenser means electrically connected with said apparatus for integrating the said current for the time interval of the positive half-cycle of the voltage being measured, whereby said condenser means is charged to a value of voltage which is proportional to the R. M. S. value of said positive half-cycle of voltage being measured; negative half-cycle selecting and measuring apparatus comprising resistors and electronic tube means for obtaining a current whose instantaneous value is at all times substantially proportional to the square of the instantaneous value of the negative half-cycles of the said voltage being measured, said negative half-cycle selecting and measuring apparatus also including condenser means electrically connected with said latter apparatus for integrating the said latter current for the time interval of the negative half cycle of the said voltage being measured, whereby said latter condenser means is charged to a value of voltage which is proportional to the R. M. S. value of said negative half-cycle of voltage being measured; a source of substantially constant voltage; timed switching means having electrical connection with said power line to have a timed operation occurring synchronously with the frequency of the half-cycle alternations on said power line, said timed switching means being connected with said two condenser means and with said source of substantially constant voltage whereby immediately after the end of the positive or negative half-cycle of voltage being measured said timed switching means brings the voltage charge of the corresponding condenser means into comparative relationship to said substantially constant voltage to produce a resultant voltage which is the difference between the two; amplifying means having a control circuit connected to respond to said resultant voltage; an oscillograph connected to the output of said amplifying means and responding in sequence to the successive positive half-cycle and negative half-cycle voltage measurements for making an oscillograph record of each individual positive and negative half-cycle of voltage on said alternating current power line; and discharge means connected with said power line to operate synchronously with the frequency of the alternating current on said line for discharging each of said condenser means after the charge on said condenser means has operated said oscillograph.

9. In apparatus for measuring flicker voltage by recording the R. M. S. (effective) value of each individual positive and negative half-cycle of voltage on an alternating current power line, the combination of a first or positive half-cycle selecting and measuring means connected with said power line for selecting and measuring the positive half-cycles whereby to obtain a current whose instantaneous value is at all times substantially proportional to the square of the instantaneous value of the positive half-cycles of said voltage being measured, a first or positive half-cycle integrating condenser connected with said first selecting and measuring means for integrating the said current for the time interval of the positive half-cycle of the voltage being measured, whereby said first integrating condenser is charged to a value of voltage which is proportional to the R. M. S. value of said positive half-cycle of voltage being measured, a second or negative half-cycle selecting and measuring means connected with said power line for selecting and measuring the negative half-cycles of the voltage for obtaining a current whose instantaneous value is at all times substantially proportional to the square of the instantaneous value of the negative half-cycles of the said voltage being measured, a second or negative half-cycle integrating condenser connected with said second selecting and measuring means for integrating the said current for the time interval of the negative half-cycle of said voltage being measured, whereby said second integrating condenser is charged to a value of voltage which is proportional to the R. M. S. value of said negative half-cycle of voltage being measured, a source of substantially constant voltage, timed switching means electrically connected with said power line to have a timed switching frequency occurring synchronously with the alternating current frequency on said power line, said timed switching means being electrically connected with said first and second integrating condensers and with said source of substantially constant voltage for bringing the voltages of said integrating condensers into comparative relationship to said substantially constant voltage, amplifying means connected to respond to the difference in voltage between the voltage charges on said first and second integrating condensers and said source of substantially constant voltage, an oscillograph connected to the output of said amplifying means so as to respond to the measured values of the successive positive and negative half-cycles and thereby record each individual positive and negative half-cycle of voltage occurring on said alternating current power line during the measured interval, and discharge means responding to the positive and negative half-cycle alternations on said power line for discharging said first and second integrating condensers after the measured charges thereon have operated said oscillograph.

10. In a device for measuring flicker voltage by recording the R. M. S. (effective) value of each individual positive and negative half-cycle of voltage on an alternating current power line, the combination of: positive half-cycle selecting and measuring apparatus comprising resistors and electronic tube means for obtaining a current whose instantaneous value is at all times substantially proportional to the square of the instantaneous value of the positive half-cycles of the said voltage being measured, said positive half-cycle selecting and measuring apparatus also including condenser means electrically connected with said apparatus for integrating the said current for the time interval of the positive half-cycle of the voltage being measured, whereby said condenser means is charged to a value of voltage which is proportional to the R. M. S. value of said positive half-cycle of voltage being measured; negative half-cycle selecting and measuring apparatus comprising resistors and electronic tube means for obtaining a current whose instantaneous value is at all times substantially proportional to the square of the instantaneous value of the negative half-cycles of the said voltage being measured, said negative half-cycle selecting and measuring apparatus also including condenser means electrically connected with said latter apparatus for integrating the said latter current for the time interval of the negative half-cycle of the said voltage being measured, whereby said latter condenser means is charged to a value of voltage which is proportional to the R. M. S. value of said negative half-cycle of voltage being measured; an oscillograph; timed switching means electrically connected to establish connection alternately between said two condenser means and said oscillograph, said timed switching means being operatively connected with said power line to have a timed switching frequency in synchronism with the frequency of the positive and negative alternations on said power line, whereby said oscillograph is caused to respond in sequence to the successive positive half-cycle and negative half-cycle voltage measurements for making an oscillograph record of each individual positive and negative half-cycle of voltage on said alternating current power line during the measured time interval; and discharge means for said two condenser means operatively connected with said power line to have a discharge frequency in synchronism with the positive and negative alternations on said power line, said discharge means being electrically connected with said two condenser means for discharging each condenser means immediately after the charge on that condenser means has caused the operation of said oscillograph, thereby leaving each of said two condenser means alternately in a discharged condition ready to again perform its integrating function for the measurement of the next positive or negative half-cycle respectively.

11. In apparatus of the class described for measuring flicker voltage on an alternating current power line, the combination of selecting and measuring means connected with said power line for selecting and measuring all half-cycles of a predetermined polarity of the alternating current on said power line whereby to obtain a current whose instantaneous value is at all times substantially proportional to the square of the instantaneous value of the half-cycles of predetermined polarity being measured, a condenser connected with said selecting and measuring means for integrating the said current for the time interval of the predetermined half-cycle being measured, whereby said condenser is charged to a value of voltage which is proportional to the R. M. S. value of the predetermined half-cycle being measured, an oscillograph connected with said condenser to respond to the voltage measurements of the successive predetermined half-cycles for making an oscillograph record of each individual predetermined half-cycle on said alternating current power line during the measured time interval, and discharge means operatively connected with said condenser for discharging the latter after the charge on said condenser has operated said oscillograph.

(References on following page)

References Cited in the file of this patent

UNITED STATES PATENTS

| | | | |
|---|---|---|---|
| 930,325 | Thomas | Aug. 3, | 1909 |
| 1,801,814 | Legg | Apr. 21, | 1931 |
| 1,990,782 | Greibach | Feb. 12, | 1935 |
| 2,082,492 | Grumel | June 1, | 1937 |
| 2,082,624 | Hagenguth et al. | June 1, | 1937 |
| 2,422,766 | Alexander | June 24, | 1947 |
| 2,440,004 | Brown et al. | Apr. 20, | 1948 |
| 2,519,295 | Shepard | Aug. 15, | 1950 |
| 2,549,976 | Kraybill | Apr. 24, | 1951 |
| 2,560,256 | Shrader | July 10, | 1951 |